United States Patent [19]

Eakman

[11] 4,366,674
[45] Jan. 4, 1983

[54] INTERNAL COMBUSTION ENGINE WITH RANKINE BOTTOMING CYCLE

[75] Inventor: Larry A. Eakman, Dunlap, Ill.

[73] Assignee: Caterpillar Tractor Co., Peoria, Ill.

[21] Appl. No.: 193,579

[22] PCT Filed: Jun. 6, 1980

[86] PCT No.: PCT/US80/00712

§ 371 Date: Jun. 6, 1980

§ 102(e) Date: Jun. 6, 1980

[51] Int. Cl.³ .................. F02B 33/40; F02G 5/04
[52] U.S. Cl. ................................................ 60/618
[58] Field of Search ............................. 60/618, 624

[56] References Cited

U.S. PATENT DOCUMENTS

| | | | |
|---|---|---|---|
| 1,006,907 | 10/1911 | Buchi | 60/598 X |
| 1,011,520 | 12/1911 | Stocks | 60/618 |
| 2,109,237 | 2/1938 | Lustig | 60/618 X |
| 2,159,758 | 5/1939 | Diedrich | 60/618 X |
| 2,370,949 | 3/1945 | Gaisberger | 60/618 |
| 3,541,783 | 11/1970 | Schmuck | 60/618 X |
| 3,948,053 | 4/1976 | Gamell | 60/618 |
| 4,182,127 | 1/1980 | Johnson | 60/618 |

FOREIGN PATENT DOCUMENTS

| | | | |
|---|---|---|---|
| 2414147 | 10/1975 | Fed. Rep. of Germany | 60/618 |
| 639234 | 6/1950 | United Kingdom | 60/618 |

Primary Examiner—Michael Koczo
Attorney, Agent, or Firm—Wegner, Stellman, McCord, Wood & Dalton

[57] ABSTRACT

An internal combustion engine with a Rankine bottoming cycle including an internal combustion engine (10) with an exhaust (12) for exhausting combustion gases. Included is an expander (24) having a mechanical output (26) for performing useful work and a boiler (18). Liquid is supplied in a line (20) to the boiler to be vaporized therein and the vaporized liquid is supplied by a line (22) to the turbine (24) to drive the same. Heat for vaporizing the liquid in the boiler (18) is obtained from the exhaust (12) on a line (62). The exhaust gases are further expanded in an expander (72) thereby providing additional useful work.

1 Claim, 1 Drawing Figure

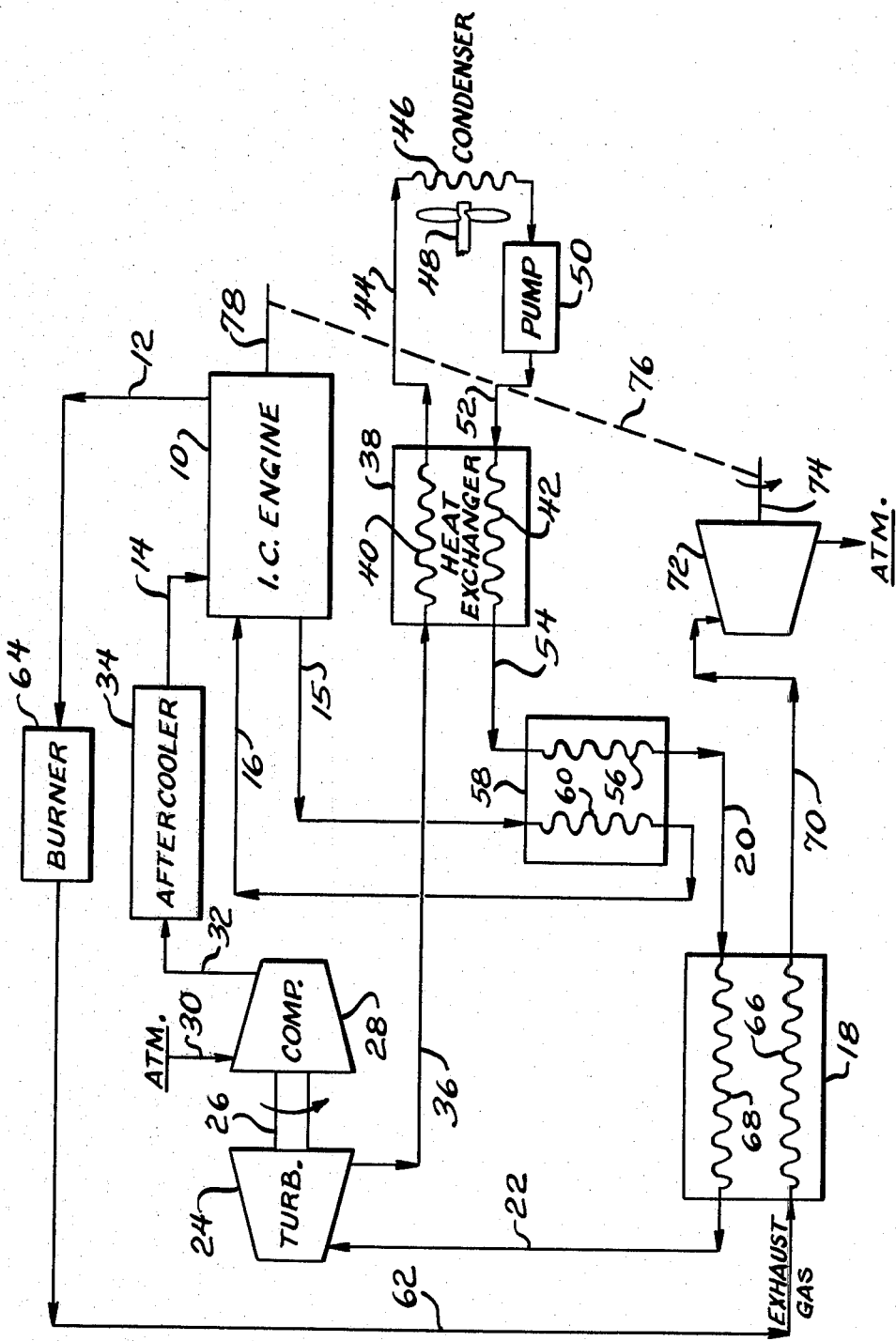

INTERNAL COMBUSTION ENGINE WITH RANKINE BOTTOMING CYCLE

DESCRIPTION

1. Technical Field

This invention relates to an internal combustion engine, and more specifically, to an internal combustion engine with a so-called "bottoming cycle", which bottoming cycle is based on the Rankine cycle.

2. Background Art

The efficiency of many internal combustion engines operating on, for example, the Otto cycle or the Diesel cycle, and which are of conventional construction is relatively low in terms of the conversion of the energy of fuel consumed to energy output. Part of the energy created by the burning of fuel in a typical internal combustion engine is not converted to work in that the expansion of exhaust gases after the opening of an exhaust port or valve is not harnessed or, if harnessed, only in a limited way. Moreover, even when the expansion of exhausted gas is partially harnessed as in a turbocharger, the exhaust gas exiting the turbocharger is typically at an elevated temperature and therefore the energy represented by the heat within the exhaust gas over the temperature differential between the ambient temperature and the temperature of the exhaust gas is likewise lost.

As a consequence, there have been many proposals for internal combustion engines with so-called bottoming cycles of various sorts where attempts have been made to extract energy from the exhaust gases. Certain of these attempts employ the Rankine cycle in the process of extracting energy from exhaust gases for the reason that the Rankine cycle provides relatively high efficiency at the temperatures involved. Examples of such proposals are disclosed in the following U.S. Pat. Nos. 2,109,237 issued Feb. 22, 1938 to Lustig; 2,360,969 issued Oct. 24, 1944 to Newcombe; 3,830,062 issued Aug. 20, 1974 to Morgan et al; 3,948,053 and 3,948,235, both issued Apr. 6, 1976 to Gamell; 3,979,913 issued Sept. 14, 1976 to Yates; and 4,031,705 issued June 28, 1977 to Berg.

While the proposals of each of the foregoing patents provide for greater operating efficiency than would be obtained by an internal combustion engine operating without a bottoming cycle, none maximize energy recovery and each may pose operational problems limiting the areas of prospective uses of the various systems.

Typically, the prior art utilizes the heat of the exhaust gases to vaporize a liquid which is then directed to an expander such as a turbine. Usually, but not always, the turbine will drive a compressor connected to the engine air intake to provide for turbocharger operating on the Rankine cycle and thereby boost energy conversion efficiency. In some cases, however, the turbine may be coupled to the output shaft of the engine itself or may be utilized to drive auxiliary equipment such as a generator or the like. As will be apparent from the following disclosure of the invention herein, these proposals do not maximize the energy recapturing process.

Moreover, operational difficulties arise in such systems where variable loads are driven by the engine and/or the engine may be relatively unloaded and operated at idle speeds on occasions. In low or no load situations, to conserve fuel, the engine is typically run at a low rate of speed and is consuming very little fuel. Consequently, the otherwise waste heat in the exhaust stream is at a relatively low temperature level which frequently will be insufficient to generate sufficient vapor to drive the turbine at a high rate of speed. Therefore, when the turbine forms part of a turbocharger for boosting pressure of combustion air to the engine, the fact that it is not being driven at a particularly rapid rate considerably slows its response to a commanded increase in speed and thereby prevents the engine from developing high power output as rapidly as may be desired in many applications.

DISCLOSURE OF THE INVENTION

The present invention is directed to overcoming one or more of the problems as set forth above.

According to the invention generally, there is provided an internal combustion engine with a Rankine bottoming cycle including an internal combustion engine with an exhaust for exhausting combusting gases and an expander having a mechanical output for performing work. The system includes a boiler and means are provided for supplying a liquid to the boiler to be vaporized therein. Means are provided for supplying the expander with vaporized liquid from the boiler and means connected the exhaust to the boiler so that heat in the exhausted gases of combustion will vaporize the liquid supplied to the boiler.

In one aspect of the invention, selectively useable means are provided for increasing the temperature of the gases of combustion after they have exited the engine so as to provide greater heat in said boiler for vaporizing the liquid when the gases of combustion exiting the engine have insufficient heat content to vaporize a desired amount of the liquid. This facet of the invention eliminates response difficulties found in prior art constructions and therefore increases the number of varying applications in which the engine of the invention may be utilized.

According to another aspect of the invention, there is provided an additional expander having a mechanical output and which is connected to the boiler to receive gases of combustion therefrom. Consequently, unlike prior art systems where only the heat content of the exhaust gases is recaptured, an engine made according to this facet of the invention additionally recaptures energy in the exhaust gas due to its being pressurized above the ambient pressure.

According to still another facet of the invention, the invention is provided with a condenser for condensing vapor received from the expander and the supply means comprises a pump for pumping liquid from the condenser to the boiler. A heat exchanger has a first fluid flow path disposed between the expander and the condenser and a second fluid flow path in heat exchange relationship with the first fluid flow path. The second fluid flow path is disposed between the condenser and the boiler. Thus, waste heat in the condensing vapor passing from the expander to the condenser preheats the liquid being supplied from the condenser to the boiler to further recapture heat energy and maximize efficiency.

Other objects and advantages of the invention will become apparent from the following specification and drawings.

BRIEF DESCRIPTION OF THE DRAWING

The FIGURE is a diagrammatic view of an internal combustion engine with a Rankine bottoming cycle made according to the invention.

BEST MODE FOR CARRYING OUT THE INVENTION

An exemplary embodiment of an internal combustion engine with a Rankine bottoming cycle is illustrated in the drawing and is seen to include an internal combustion engine 10 which may operate on the Otto or Diesel cycles. The engine 10 includes an exhaust 12 for exhausting the gases of combustion and an air intake 14 for receiving combustion air.

Preferably, the engine 10 is liquid cooled and includes a coolant line 15 through which hot coolant exits the engine 10 and a line 16 through which cooled coolant is directed to the engine 10 for cooling purposes in a conventional fashion. The system further includes a boiler or heat exchanger 18 for the purpose of vaporizing a liquid directed to the boiler 18 on a line 20. The vaporized liquid exits the boiler 18 on a line 22 and is directed to an expander 24 in the form of a turbine. The expander-turbine 24 has a rotary output shaft 26 which is employed to drive a compressor 28. The compressor 28 receives air from the ambient via an inlet 30 and compresses the same. The compressed air is directed via an outlet 32 to an aftercooler 34 and then from the aftercooler to the air intake 14 for the engine 10. The aftercooler 34 is not absolutely necessary but increases the efficiency of the cycle in that the compressor 28 and the aftercooler 34 followed by compression in the engine itself, combine to approximate isothermal compression for maximum efficiency.

The vaporized liquid used to drive the turbine 24 exits the same on a line 36 at a considerably lower pressure than when it entered the turbine 24 but still at elevated temperature. The line 36 extends to a heat exchanger 38 having a first flow path 40 receiving the vapor exiting the turbine 24 on the line 36. The heat exchanger 38 includes a second fluid flow path 42 in heat exchange relationship with the first flow path 40.

Fluid exiting the heat exchanger 38, and specifically the first flow path 40 thereof, is directed via a line 44 to a condenser 46 which may be cooled by a fan 48 which may be driven by the engine 10. In the condenser 46, all vapor is condensed to a liquid and is drawn therefrom by a pump 50 to be directed through a line 52 to the second fluid flow path 42 through the heat exchanger 38. The pump 50 pressurizes the liquid to a pressure equal to or above the pressure of the vapor in the line 22.

It will be appreciated that the liquid in the second fluid flow path 42 will be heated by the vapor flowing in the first flow path 40. As will be seen, the heat exchanger 38 thus serves to preheat the liquid vaporized in the boiler 18.

Liquid in the second flow path 42 exits the heat exchanger 38 on a line 54 which may be connected directly to the supply line 20 for the boiler 18. Alternately, and preferably, the exit line 54 from the heat exchanger 38 is connected to the supply line 20 via the first flow path 56 of an additional heat exchanger 58. The coolant lines 16 and 15 for the engine 10 are connected to a second flow path 60 in the heat exchanger 58 which is in heat exchange relation with the flow path 56. Thus, hot coolant from the engine is utilized to further preheat the liquid being supplied to the boiler 18 as well as to cool the coolant before retaining it to the engine 10 through the line 16.

The incoming liquid on the line 20 to the boiler 18 is vaporized by heat obtained from the exhaust gas. Specifically, a line 62 connected to the engine exhaust 12 directs hot exhaust gas through the boiler 18 to heat the incoming liquid on line 20 and vaporize the same.

To avoid sluggish response to change in the loading condition, the invention contemplates that the line 62 may be provided with a burner 64 which may be selectively used to increase the temperature of the exhaust gases to a temperature above that at which they exhaust the engine 10.

For example, if the engine 10 is at idle, usually the gases from the exhaust 12 will have insufficient heat content to vaporize an appreciable amount of liquid in the boiler 18 to drive the turbine 24 at a sufficient speed to appreciably turbocharge the engine 10. This may also be true in some instances when the engine is turning at relatively high speeds but operating under little or no load, or even being driven by a vehicle coasting down a long grade.

Consequently, when the load is abruptly increased or if engine speed is attempted to be increased, there will be a considerable lag in time before the heat content of the exhaust gases due to increased fuel supply in either occurrence will vaporize enough liquid in the boiler 18 to drive the turbocharger formed by the turbine 24 and the compressor 28 at a high rate of speed to elevate boost pressure to the most efficient value.

This difficulty may be largely avoided through the use of the burner 64. When such conditions arise and a rapid response is required, the burner 64 is selectively operated to elevate the temperature of the exhaust gases above that at which they exit the engine 10 to thereby rapidly increase the heat content of the exhaust gases to speed up the vaporization process and increase the rate of response of the turbocharger.

According to the invention, the flow path 66 through which the exhaust gases flow in the boiler 18 is constructed so that there is good heat exchange from the exhuast gas to the liquid received on the line 20 and flowing in a flow path 68 through the boiler 18 and yet allows the exhaust to flow through the path 66 with minimal pressure drop. Thus, pressurized exhaust gases exiting the flow path 66 from the boiler 18 may be directed via a line 70 to a further expander 72 to be expanded down to atmospheric pressure. The expander 72 preferably is a turbine having a rotary output shaft 74. The output shaft 74 may be utilized to drive auxiliary components in the system as is known or, in the alternative, may be mechanically coupled as shown schematically at 76 to the output shaft 78 of the internal combustion engine 10.

INDUSTRIAL APPLICABILITY

From the foregoing, it will be appreciated that an engine made according to the invention maximizes the recovery of otherwise waste energy in the exhaust of an internal combustion engine utilizing the highly efficient Rankine cycle. The extraction of heat energy from the exhaust gas in a boiler without substantial pressure loss prior to expansion of the exhaust gases in a turbine or the like maximizes efficiency and allows recapture of both heat and pressure energy which otherwise may be wasted. The provision of the optionally used burner 64 minimizes or eliminates response difficulties in prior art systems allowing greater flexibility of use. At the same time, the system not only makes use of the heat content of the exhaust gas for vaporization purposes in the boiler 18, but utilizes pressure energy of the exhaust by expanding it in the expander 72 to provide useful work.

The invention further utilizes the heat content of low pressure vapor exiting the expander 24 to preheat the liquid that is subsequently vaporized to further recapture energy in the system. It will likewise be appreciated that this feature enables the use of a smaller condenser than heretofore required since less heat must be dissipated at the condenser 46 to condense the liquid, much of the heat already being removed in the heat exchanger 38.

The invention also makes use of heat from the engine that would ordinarily be rejected to the coolant through the use of the heat exchanger 58. It is to be noted however that in some instances, the heat exchanger 58 could be dispensed with the condensed liquid from the pump 50 being circulated directly through the engine block 10 before being supplied to one or the other or both of the heat exchanger 28 and the boiler 18. Generally, however, it will be preferable to use the heat exchanger 58 since engine coolant will often contain anti-freeze and corrosion inhibitors which may interfere with proper operation of the turbine 24.

I claim:

1. An internal combustion engine with a Rankine bottoming cycle comprising:
   an internal combustion engine (10) including an exhaust (12) for exhausting combustion gases;
   an expander (24) having a mechanical output (26) for performing work;
   a boiler (18);
   means (20,50) for supplying liquid to said boiler to be vaporized therein;
   means (22) for supplying the expander with vaporized liquid from said boiler;
   means (62) connecting said exhaust to said boiler so that heat in the exhausted gases of combustion will vaporize the liquid supplied to said boiler;
   a condenser (46) for condensing vapor received from said expander;
   said liquid supply means comprising a pump (50) for pumping liquid from said condenser to said boiler;
   a heat exchanger (38) having a first fluid flow path (40) disposed between said expander and said condenser and a second fluid flow path (42) in heat exchange relationship with said first fluid flow path and disposed between said condenser and said boiler;
   whereby waste heat in the fluid passing from said expander to said condenser preheats liquid flowing from said condenser to said boiler; said internal combustion engine being cooled and including means (15,16) for circulating coolant liquid;
   an additional heat exchanger (58) receiving preheated liquid from said first heat exchanger prior to its entry into said boiler and receiving heated engine coolant from said circulating means for further preheating said preheated liquid prior to its vaporization in said boiler; and
   an additional expander (72) having a mechanical output (84) and connected to said boiler to receive said gases of combustion and expand the same to obtain useful work;
   said first named expander comprising a turbine with its mechanical output having a shaft (26) connected to a rotary compressor (28), said compressor having an inlet (30) and an outlet (32), said internal combustion engine further including an inlet (14) for receiving combustion air, said compressor outlet being connected to said engine inlet by cooling means (34);
   said engine further including a mechanical output shaft (78) and said additional expander comprising a turbine having a shaft (74) connected (76) to said engine shaft.

* * * * *